March 7, 1944.  H. W. GILFILLAN ET AL  2,343,291
POWER TRANSMISSION
Filed Sept. 20, 1940　　5 Sheets-Sheet 1
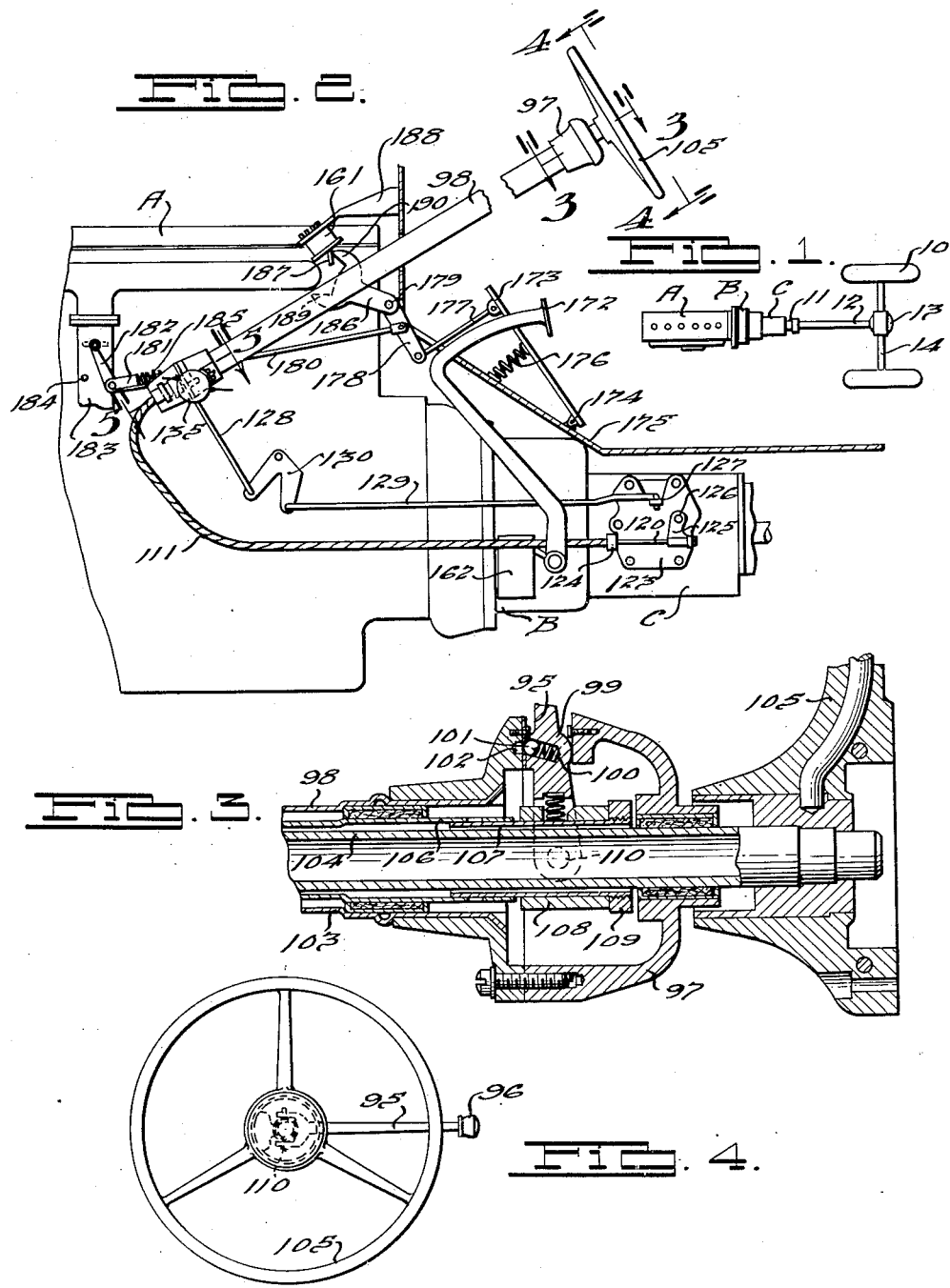
INVENTORS.
Henry W. Gilfillan,
Edgar L. Bailey.
BY
Harness, Dickey, Pierce & Harris
ATTORNEYS.

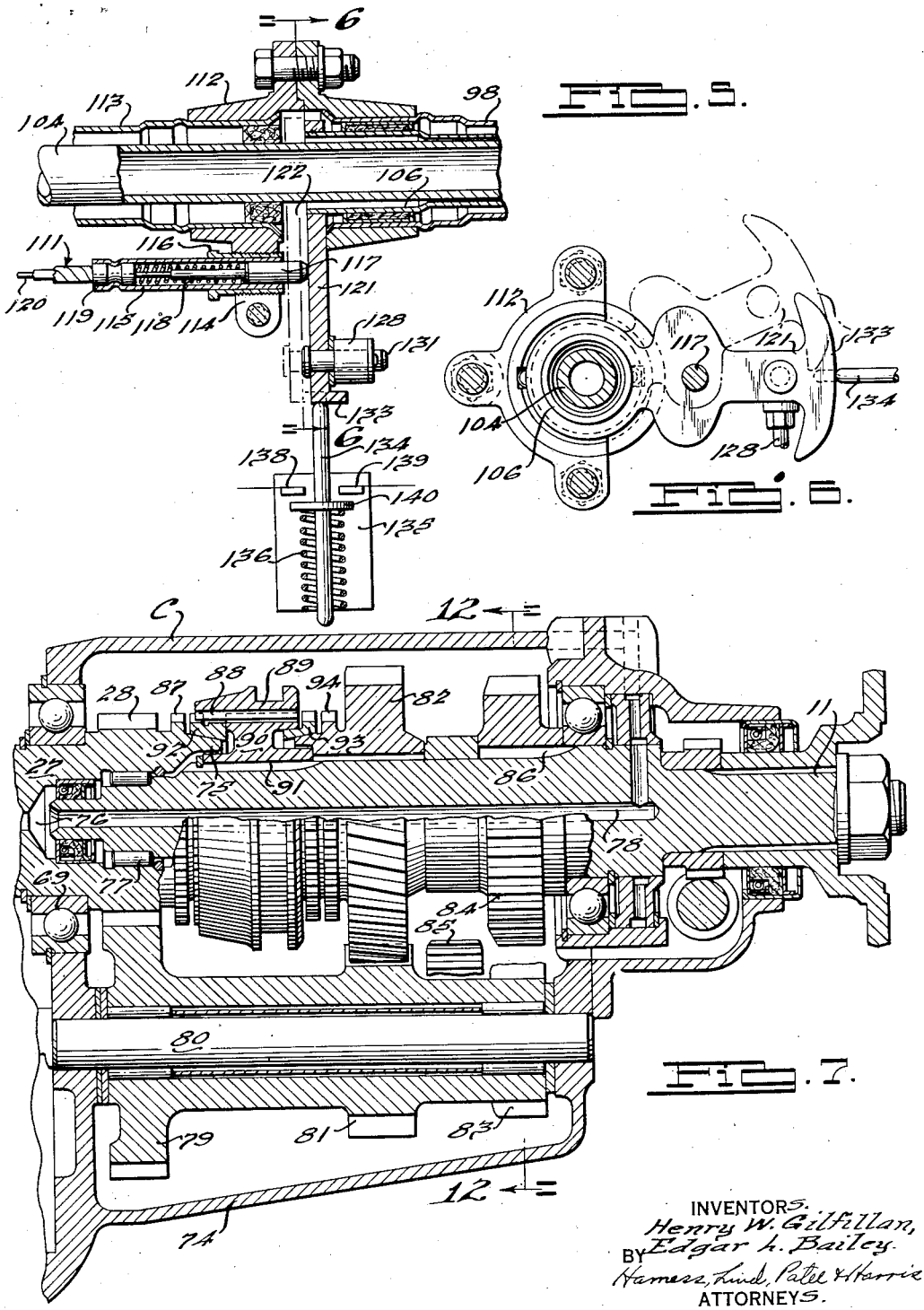

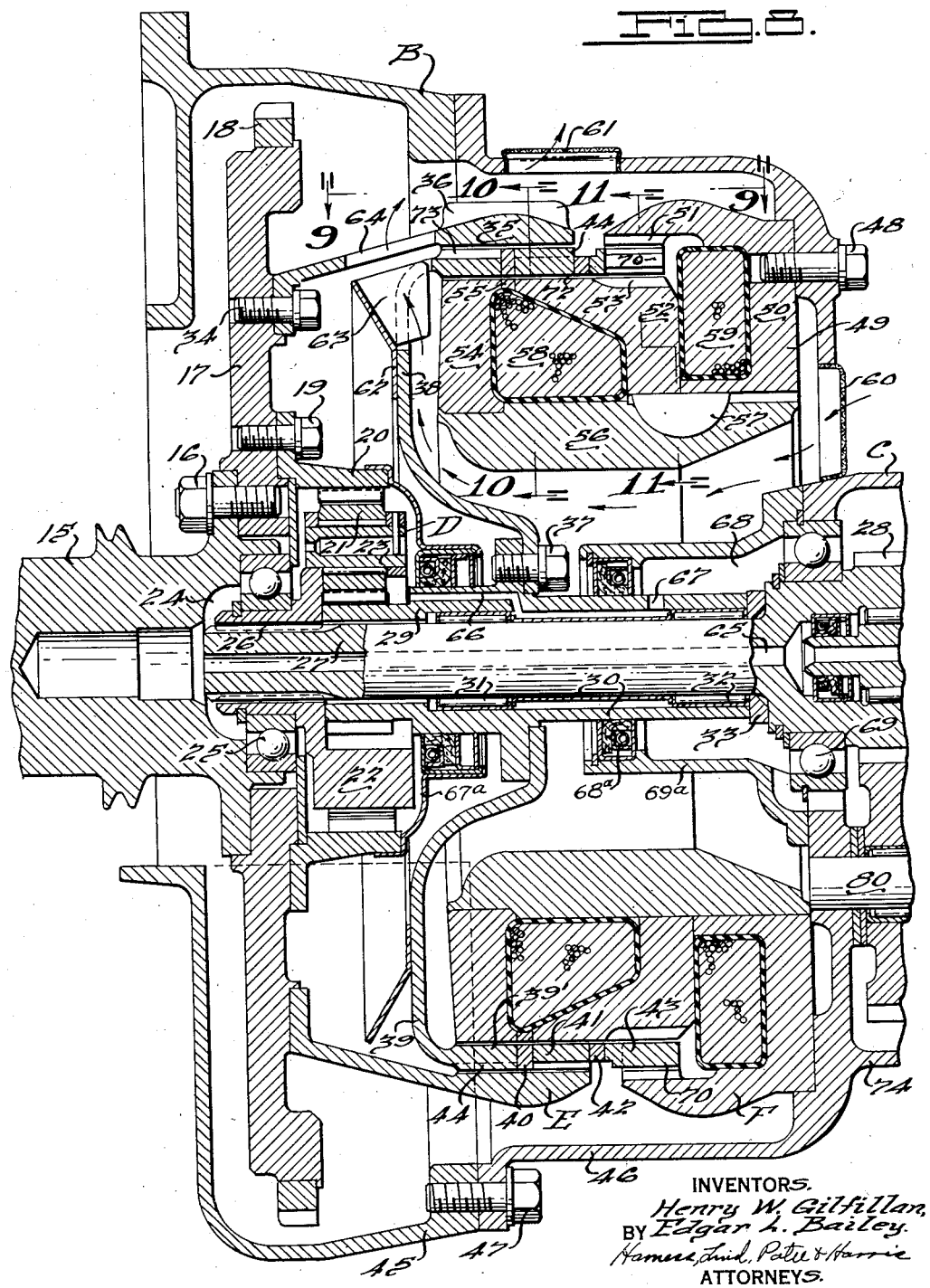

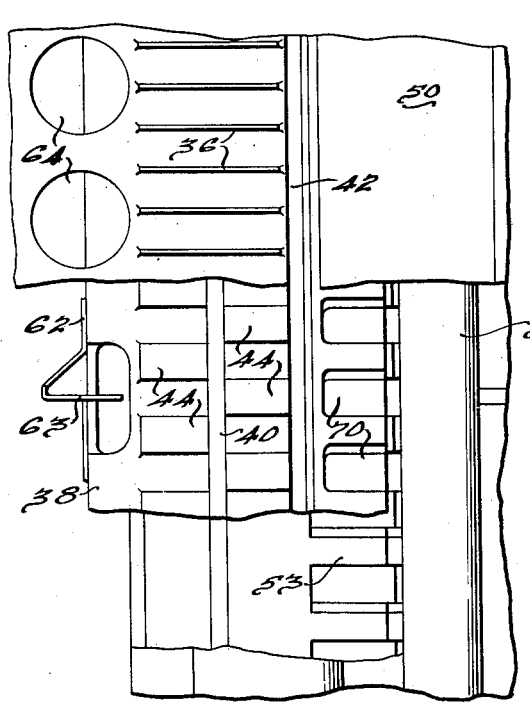
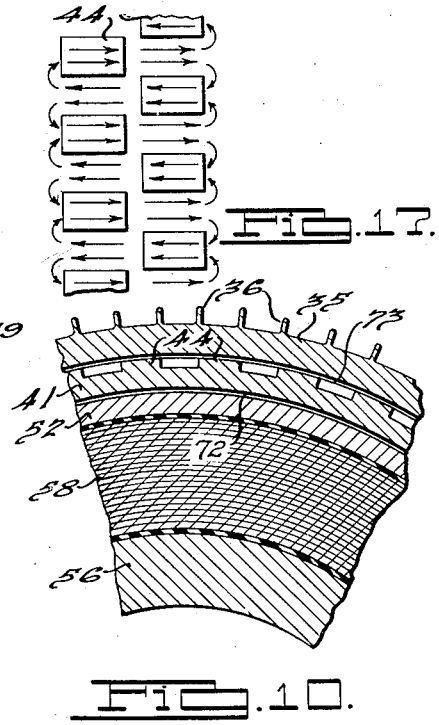
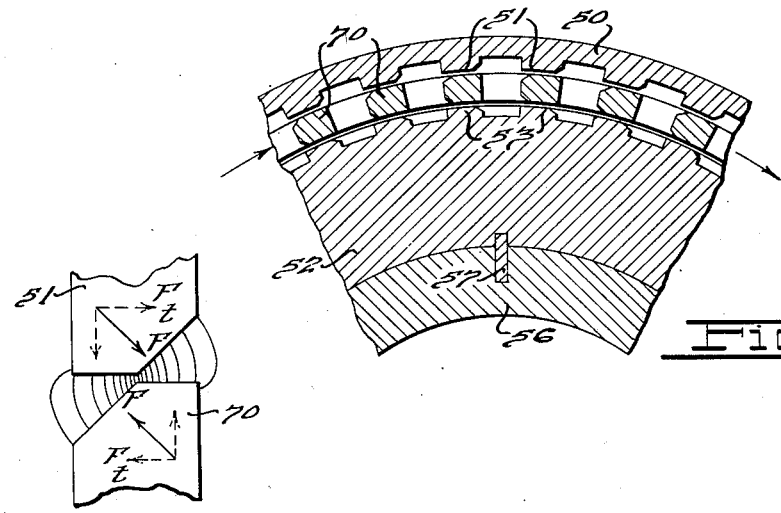

March 7, 1944.   H. W. GILFILLAN ET AL   2,343,291
POWER TRANSMISSION
Filed Sept. 20, 1940    5 Sheets-Sheet 5
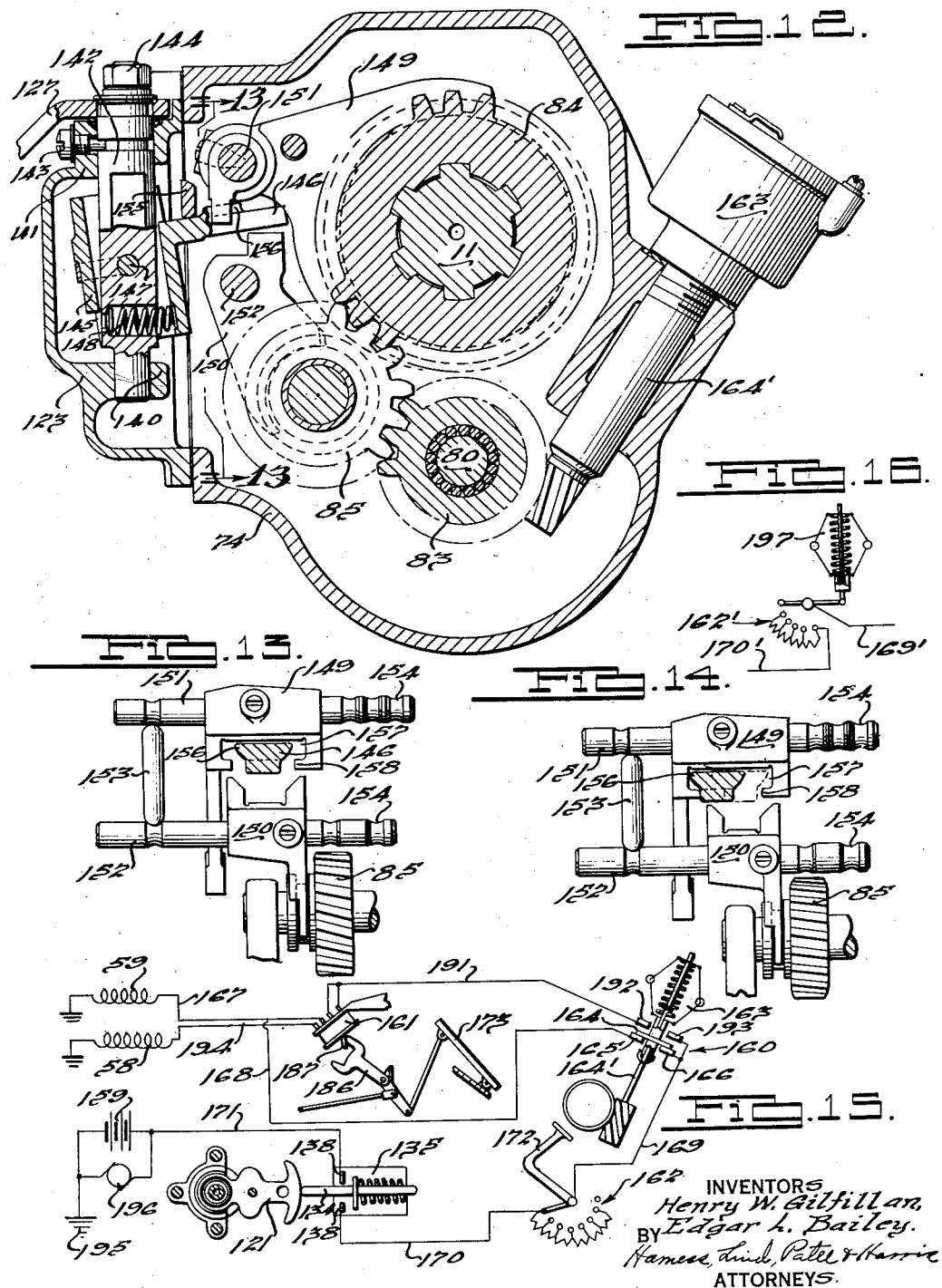
INVENTORS
Henry W. Gilfillan,
Edgar L. Bailey.
BY
Harness, Dickey, Pierce & Harris
ATTORNEYS.

Patented Mar. 7, 1944

2,343,291

UNITED STATES PATENT OFFICE 2,343,291

POWER TRANSMISSION

Henry W. Gilfillan, Detroit, and Edgar L. Bailey, Birmingham, Mich., assignors to Chrysler Corporation, Highland Park, Mich., a corporation of Delaware Application September 20, 1940, Serial No. 357,528

39 Claims. (Cl. 74—260)

This invention pertains to automotive power transmissions.

More particularly, it relates to a power transmission of the electrodynamic type wherein a planetary gearset is disposed in combination with electromagnetic brake and clutch devices of the eddy current type; the arrangement being such that torque multiplication is obtained through the planetary gearset for starting and acceleration of the vehicle, the sun gear being held against rotation by operation of the eddy current brake, while the planetary gearset is locked up in one to one ratio at the end of the acceleration period by operation of the eddy current clutch, suitable control mechanism being provided.

It is the principal object of the present invention to provide an improved automatic power transmission suitable for use in motor vehicles.

An additional object is to provide in such a transmission simplified mechanism adapted for automatic control making possible the elimination of many parts now found in conventional automobile power transmissions without, however, eliminating or sacrificing any of the speed or acceleration characteristics thereof.

A further object is to provide a transmission in which the conventional mechanical clutch is eliminated.

A still further object is to provide an improved eddy current clutch wherein the field coil and the greater portion of the iron mass remains stationary during operation whereby the rotating mass is considerably reduced and the efficiency raised.

A still further object is to provide a combined eddy current clutch and brake device having a stationary unitary field structure.

A still further object is to provide a transmission of the aforesaid type wherein the electrical unit is required to transmit only a minor portion of engine torque thereby permitting the size of this unit to be reduced with consequent reduction in weight and cost.

A still further object is to provide improved means for cooling the electrical unit.

A still further object is to provide improved and simplified control means for the transmission including means for instantaneously effecting a shift to a lower driving ratio without the necessity of interrupting the engine ignition or of closing the throttle.

A further object is to provide a simple form of sliding gear box adapted for use with the aforesaid transmission to accommodate driving of the vehicle in reverse and under conditions where an extremely low driving ratio is desired, together with control means for said box.

Other objects and advantages of the invention will become apparent from the following description.

In the drawings which accompany the description, and which illustrate a preferred embodiment of the invention, Fig. 1 is a diagrammatic showing of the power plant and drive mechanism of a vehicle incorporating the present invention.

Fig. 2 is a side elevation of the power plant and transmission mechanism.

Fig. 3 is a sectional view along line 3—3 of Fig. 2.

Fig. 4 is a sectional view along line 4—4 of Fig. 2.

Fig. 5 is a sectional view along line 5—5 of Fig. 2.

Fig. 6 is a sectional view along line 6—6 of Fig. 5.

Fig. 7 is a longitudinal sectional view of the rear gearbox unit of the transmission.

Fig. 8 is an elevational sectional view of the forward electrical unit of the transmission, certain of the parts being shown in section.

Fig. 9 is a fragmentary plan view taken as indicated by the arrows 9—9 in Fig. 8, parts being broken away where necessary to show details thereof.

Fig. 10 is a sectional view along line 10—10 of Fig. 8.

Fig. 11 is a sectional view along line 11—11 of Fig. 8.

Fig. 12 is a sectional view along line 12—12 of Fig. 7.

Fig. 13 is a diagrammatic view on a reduced scale of the Fig. 12 shift mechanism, the view being taken as indicated in the arrows 13—13 on Fig. 12, and the parts being shown in neutral position.

Fig. 14 is a view of the Fig. 13 parts in one of their shifted positions.

Fig. 15 is a wiring diagram of the transmission.

Fig. 16 illustrates a modification of the wiring diagram of Fig. 15.

Fig. 17 is a diagrammatic illustration of the eddy currents flowing in the clutch armature during operation of the clutch, and Fig. 18 is a diagrammatic illustration of the flux flow between the teeth of the brake during operation thereof.

Referring to the drawings wherein reference characters are used to designate corresponding parts referred to in the following description, Fig.

1 illustrates a typical arrangement of transmission mechanism in a vehicle embodying the present invention. The vehicle engine A is coupled to the driving wheels 10 of the vehicle through a pair of torque multiplying units B and C; the unit B consisting of an electrically controlled underdrive unit illustrated in detail in Fig. 8 and the unit C consisting of a manually controlled high, low and reverse gearbox illustrated more fully in Fig. 12. The output shaft 11 of unit C is connected by means of the usual propeller shaft 12 with the differential gearbox 13, which in turn, drives the axle shafts 14.

Referring for the moment to Figs. 8 to 11, inclusive, 15 designates the rear end of the crankshaft of engine A, which crankshaft is bolted by bolts 16 to the usual flywheel 17. The latter is provided with the familiar ring gear 18 which forms part of the engine starting mechanism.

Secured to flywheel 17 by bolts 19 is an annulus gear 20 which forms part of a planetary gearset which is generally designated by the letter D. The gear 20 meshes with a plurality of planet gears 21 carried for rotation on a carrier 22 through the intermediary of a plurality of axles 23. The carrier 22 extends forwardly into the hollow portion 24 of crankshaft 15 and is supported therein by an anti-friction thrust bearing 25.

Carrier 22 is splined at 26 to a shaft 27 on the rear end of which is integrally formed the input pinion 28 of the rear gearbox C. Also meshing with planet gears 21 is a sun gear 29. The latter is provided with a rearwardly extending hub 30 and is rotatably mounted on the shaft 27 by a pair of anti-friction bearings 31, 32, an abutment ring 33 maintaining the parts in their correct positions.

Bolted to the flywheel 17 at 34 is an annularly shaped member 35 of iron or other suitable magnetic material which constitutes the driving member of the electrical eddy current operated clutch, generally referred to by the letter E. The member 35 has cooling fins 36 machined in the outer surface thereof, the purpose of which will be brought out later on in the description.

Fixed to the sun gear hub 30 by bolts 37 is a spider 38 which constitutes the driven member of the clutch. The spider 38 is provided with a built-up cylindrical inductor portion having alternate magnetic and non-magnetic sections. Fig. 8 illustrates a preferred form of spider which consists of a drive portion 39 of iron to which is welded or otherwise suitably fixed a non-magnetic ring 40 of stainless steel, brass, or the like. To the ring 40 an iron ring 41 is fixed, followed by a second non-magnetic ring 42, the latter in turn being followed by a second iron ring 43. The cylindrical portion 39' of the spider driving portion 39 and the iron ring 41 are provided on their outer surfaces with alternately disposed teeth 44 (see Figs. 9 and 10) the purpose of which will soon become apparent.

The housing for the underdrive unit B is formed of two casing members 45 and 46 fastened together by a plurality of cap screws one of which is shown at 47. Attached to the casing 46 by a plurality of screws such as that shown at 48 is a built-up iron core member 49. The core member consists of a substantially U-shaped portion 50 provided with radially inwardly extending teeth 51, to which is secured a portion 52 having radially outwardly extending teeth 53, and a portion 54 spaced from the portion 52 in the vicinity of the ring 40 by a similar non-magnetic ring 55, the whole assembly being retained in place by the annular portion 56 which is keyed to the portion 50 by a key 57. A pair of field coils 58 and 59 respectively are carried by the core assembly in the relationship shown in Fig. 8. The coils are adapted for excitation from the regular vehicle battery through suitable connections (not shown), the excitation thereof being under the control of apparatus about to be described.

Casing 46 is provided with a plurality of holes for the reception of screens such as those shown at 60 and 61 through which cooling air is circulated as indicated by the arrows in Fig. 8. A stamped air impeller element 62 is attached to the clutch spider 38 and is provided with integral vanes 63 for creating circulation. The clutch drive member 35 is provided with circumferentially spaced holes 64 which permit passage of air outwardly thereof.

The rotating parts of the underdrive unit B are lubricated by oil from gearbox C (which is partially filled with lubricating oil as is common practice in the art) which travels through passage 65 of shaft 27 thence by way of bearing 25, gearset D and passages 66 and 67 to the hollow space 68 from where it can flow back to gearbox C through bearing 69. Suitable seals 67a and 69a are provided to confine the lubricant to the necessary path, the latter seal being placed between the sun gear hub 30 and a forwardly extending quill 69a carried by the rear wall of casing 46.

The planet gearing D may have any desired ratio, the one illustrated being constructed and arranged to provide a 1:38 to 1 speed reduction between crankshaft 15 and shaft 27 when sun gear 29 is held against rotation. The ratio 1:38 to 1 is suitable for both acceleration at low speeds and for kickdown acceleration of the vehicle at relatively high speeds, and with this ratio it is apparent that only a portion of engine torque (approximately 40%) is transmitted through the electrical unit, the rest being transmitted directly through the mechanical gear connection.

In the operation of the device as so far described, rotation of the engine crankshaft 15 in the usual clockwise direction will cause corresponding rotation of annulus gear 20. If field coils 58 and 59 are de-energized, the reaction of shaft 27 (which is assumed to be connected to the vehicle drive wheels) will cause sun gear 29 and spider 38 to be rotated in reverse direction at approximately 2½ times crankshaft speed, no torque being transmitted to shaft 27.

Under such conditions, if field coil 59 is energized, magnetic flux will flow in a circular path through the portions 50, 52 and 56 of iron core 49. This flux will flow across the air gap between teeth 51 and 53 and to a much lesser extent across the relatively wide gap between adjacent pairs of radially aligned teeth. As illustrated in Figs. 9 and 11, the portion 43 of spider 38 has teeth 70 formed thereon. These teeth (or poles) are spaced from one another in such manner that they will align radially with the teeth (or poles) 51 and 53 of the core 49 and with the spaces between teeth 51 and 53 respectively in alternate fashion during rotation of spider 38.

Now it is obvious that when teeth 51, 70 and 53 are all in radial alignment, the flux flowing in core 49 around coil 59 will flow through the iron of the teeth 70 and thus will encounter relatively low resistance to flow, the reluctance of the air gap between oppositely disposed teeth 51 and 53 having been reduced by the iron in teeth 70. Correspondingly, when the teeth 70 are radially aligned with the spaces between the respective sets of teeth 51 and 53, the flux will encounter relatively great resistance to flow because of the reluctance of the large air gap between teeth 51 and 53. In other words, the flux is at a maximum when teeth 51, 70 and 53 are aligned, and at a minimum when teeth 70 are out of alignment with teeth 51 and 53.

Accordingly, during rotation of spider 38 the flux will fluctuate between maximum and minimum values, the frequency thereof being determined by the speed of rotation of the spider, and eddy currents will be induced in teeth 51, 70 and 53 and likewise in the core 49. The eddy currents flow in a direction perpendicular to the path of the flux ranging in voltage in accordance with the speed of the spider, and induce a flux of their own which reacts with the main flux and tends to prevent relative rotation between the spider 38 and core 49. This is in accordance with Lenz's Law which states, in effect, that change in magnitude of a magnetic field induces a current so directed that its magnetic effect tends to oppose the magnetic change which produced it.

The effect of the flux flowing through the teeth 51, 70, 73 then, will be to slow down the reverse rotation of the spider 38 and cause it to stop whereupon the direct magnetic pull of the flux will hold it stationary. With the spider 38 thus held against rotation by the magnetic pull across teeth 51, 53, the planetary gearset D will, through reaction on sun gear 29, transmit a torque multiplying drive to shaft 27 whereupon the vehicle will be accelerated in underdrive at a speed dependent upon the speed of the engine A. It will be appreciated that torque will be imposed on shaft 27 from the instant that spider 38 begins to slow down, therefore the vehicle will be started in a smooth and gradual manner, the brake F functioning as an exceptionally smooth-acting clutch.

Acceleration of the vehicle in underdrive may be continued as long as desired and when a sufficient speed has been attained, coil 59 may be de-energized and coil 58 energized whereupon brake F will release spider 38 and clutch E will magnetically couple the spider 38 to the driving member 35 for forward rotation therewith.

Energization of field coil 58 causes flux to flow through portions 56 and 54 of core 49, thence across the narrow air gap 72, through portion 39' of spider 38, across air gap 73 into the driving member 35 and back to portion 56 through portion 41 of the spider and 52 of the core, the air gaps 72 and 73 being also crossed on the return circuit. The non-magnetic rings 40 and 55 assist in confining the flux to a definite path and the non-magnetic ring 42 helps to separate the flux circuit of coil 58 from that of coil 59 and vice-versa.

As illustrated in Figs. 8 and 10, the radially adjacent surface portions of the core 49 and spider 38 that form the magnetic circuit for the flux produced by coil 58 are smooth. No eddy currents will therefore be induced by reason of the relative rotation of these two parts and the air gap 72 may be made extremely narrow (in the order of two or three thousandths of an inch) thereby providing as low reluctance as possible.

As can be more clearly seen from Fig. 9 and the diagram of Fig. 17, the teeth 44 on portions 39' and 41 of the spider are alternately arranged. This is for the purpose of providing an easier path of flow for the eddy currents induced by the teeth. If the teeth were disposed opposite one another high current densities would result at the inner tips thereof because of the fact that opposing voltages in juxtapositioned teeth would crowd the currents traveling in each direction into a comparatively small volume of iron.

Energization of coil 58 then produces flux at high density which crosses the air gap 73 from the teeth 44 to the driving member 35. Very little flux enters the member 35 at points between the teeth 44 therefore, there exist in the member 35 alternate regions of high and low flux density. When the members 35 and 38 are rotating relatively to one another a point on the member 35 moves alternately through regions of high and low flux density, thus the flux flowing through said point varies in magnitude and eddy currents are induced. These eddy currents produce an opposing flux which, in accordance with Lenz's law, tends to oppose relative rotation of the members 35 and 38.

The member 38 therefore will tend to approach the speed of the driving member 35 and to rotate at synchronous speed therewith, whereupon the planetary gearset D will be locked up as a unit and drive will be transferred from flywheel 17 to shaft 27 at one to one ratio. In practice, the spider 38 never quite reaches the speed of member 35, there always being present a certain amount of slip which varies with the speed and torque, but is small (in the order of three percent) at cruising speeds.

During operation of the underdrive unit there is necessarily a considerable amount of heat generated. The air impelling vanes 36 on the member 35, which is always rotating at engine speed, and the vanes 63 on the spider, provide continuous circulation of air through the housing; the air entering through the screen 60 and flowing out through the screen 61 as indicated by the arrows in Fig. 8.

It will be noted from Fig. 11 that the teeth 51, 53 and 70 are chamfered at their trailing edges and the reason for this will be made clear by reference to Fig. 18 when a single pair of teeth, 51 and 70, are diagrammatically represented. It is well known that magnetic flux leaves and enters a pole tip at right angles to the surface thereof, providing of course, that infinite permeability of the iron is assumed. The attractive force of the flux is in the direction thereof and is proportional to $B^2A$ where B represents the flux density and A the area over which it exists. It is therefore evident that only the flux which strikes the pole (or tooth in this case) at right angles to the radial surface thereof is useful in producing a tangential force, the flux passing between circumferential surfaces producing only a radial force which is not useful.

By providing chamfered tips as shown in the drawings, practically all of the flux passing between the teeth is useful. Although the flux, and consequently the force F, is perpendicular to an inclined portion of the teeth, there is present a tangential component Ft, which is large. It is also apparent that the flux density along the chamfered portions decreases rather slowly, which is not the case with flat teeth, therefore the value of $B^2$ will be large over a comparatively larger area than is the case with flat teeth.

Referring now to Figs. 1-7, inclusive, and Figs. 12-16, inclusive, it will be seen that the shaft 27 extends rearwardly into the housing 74 of the gearbox C in which it terminates in a cone-shaped clutch portion 75. A hollow portion 76 provides space for the roller bearing 77 which pilots the forward end of the tail shaft 11. Lubricant is circulated through the gears, bearings, etc. through suitable holes which connect with the central bore 78 of shaft 11.

The pinion 28 is the input element of the box C and meshes with a gear 79, the latter being one of a cluster rotatably carried on a countershaft 80. The cluster also includes a gear 81 which meshes with the low speed driven gear 82, and a gear 83 which is adapted to be engaged by an idler gear 85 for providing reverse drive, the gear 85 simultaneously meshing with the gear 83 and a gear 84 splined at 86 on shaft 11.

The shaft 27 is formed with a set of clutch teeth 87 which are adapted for engagement by complementary internal clutch teeth 88 formed in clutching sleeve 89, the latter being slidable on a hub 90 which is splined at 91 on shaft 11. Suitable blocker synchromesh mechanism 92 is provided to facilitate smooth and noiseless engagement of the sleeve 89 with the teeth 87. Inasmuch as any suitable type of blocker synchromesh may be used, this part of the mechanism will not be described in detail, it being deemed sufficient to briefly refer to the salient parts thereof.

A similar blocker synchromesh mechanism 93 is provided for facilitating meshing of the teeth of sleeve 89 with the clutch teeth 94 formed on low speed gear 82.

The mechanism for shifting sleeve 89 and idler gear 85 to provide two forward speeds and reverse comprises a hand actuated lever 95 (Fig. 4) having a knob 96 at the outer end thereof. The lever 95 is carried by a casing 97 which forms part of the steering column referred to generally by numeral 98. The casing 97 has separable sections for purposes of assembly and a slot is provided for receiving a ball-shaped enlargement 99 of lever 95. The portion 99 of the lever has a bore 100 in which a spring pressed detent 101 is disposed. The detent 101 is adapted to engage in an aperture formed in the wall of the slot as shown in Fig. 3.

The steering column includes an outer tube 103 on which the casing 97 is mounted, and an inner tubular steering shaft 104 which carries the steering wheel 105. A tubular shaft 106 extends longitudinally of the column and is slidably and rotatably supported by the column structure. Mounted in the upper end of the tubular shaft 106 is a sleeve 107, which is welded thereto and extends beyond the upper extremity thereof. A collar 108 is rigidly secured in place on the shaft by a nut 109. The collar 108 is provided with bosses for receiving pins 110 which are carried by the forked inner end portion of the lever 95. The enlarged portion 99 of the lever serves as a fulcrum about which the lever may be oscillated in a vertical plane to shift the shaft 106 vertically of the steering column. The shaft 106 may be rotated about its axis which is coincident with the longitudinal axis of the steering column by swinging the lever 95 about the axis of the column.

Axial movement of the shaft 106 is transmitted to the selector mechanism in casing 74 by a Bowden wire assembly generally designated by numeral 111. One end of the Bowden assembly is mounted in the lower portion of a separable coupling 112 by means of which an extension 113 of the column housing 98 is supported. The lower element of the coupling 112 is provided with an apertured flange 114 in which a metal tube 115 is fixed by means of a threaded fitting 116. Slidably carried in the tube 115 is a plunger 117 normally urged upwardly of the column by a spring 118 which bears between the plunger and a fitting 119. A flexible cable 120 extends through the plug 119 and is attached to the plunger 117. The latter bears against a plate 121 non-rotatably fixed on the lower extremity of the shaft 106 and which extends outwardly of the coupling 112 through a slot 122 in the side thereof, the slot being approximately twice as wide as the thickness of the plate 121 for accommodating shifting thereof axially of the column.

The opposite end of the Bowden wire assembly extends to the cover plate 123 of the housing 74 where it is received by a fitting 124, the flexible cable 120 being attached to a lever 125 swingably mounted at 126. It is apparent that reciprocation of the shaft 106 will cause corresponding swinging of lever 125, the motion being transmitted by the cable 120.

Rotative movement of the shaft 106 is transmitted to a shift lever 127 by means of a pair of links 128, 129 connected by a bell crank 130, the link 128 being pivoted to the plate 121 by means of a pin 131. The plate 121 has a cam shaped portion 133 against which a plunger 134 of a switch 135 is adapted to bear. The switch 135 has a pair of terminals 138, 139 which are adapted to be bridged by the contact member 140 upon movement of plunger 134 under the influence of spring 136 when the plate 121 is in certain positions as will be more fully explained.

The cover 123 (Fig. 12) is provided with a pair of aligned bosses 140, 141 in which is mounted a rock shaft 142, a set screw 143 holding it against displacement. The shift lever 127 is operatively secured on the top of the rock shaft by a nut 144.

Rockably mounted on shaft 142 is a trunnion element 145 having an integral shift finger 146. The element 145 is rockable about a mounting pin 147 and is biased to the position illustrated by a coiled compression spring 148.

The sleeve 89 and gear 85 are shifted by a pair of shifter forks designated 149 and 150 respectively, these forks being carried by a pair of shiftable rails 151 and 152. The rails are provided with the usual interlocking plunger 153 and detent receiving grooves 154 as illustrated diagrammatically in Figs. 13 and 14.

The shift finger 146 is normally maintained in engagement with the fork 149 by the spring 148, thus the shift mechanism is normally conditioned for effecting a shift of the sleeve 89 upon swinging of the lever 95 about the axis of the steering column. In order to shift the reverse gear 85 it is necessary to disengage the finger 146 from the fork 149 and engage it with the fork 150 which is accomplished by rocking the lever 95 upwardly resulting in downward movement of plate 121 to the dotted line position of Fig. 5. This movement of the plate 121 transmits a push to selector lever 125 through the Bowden cable 120. The selector lever 125 is connected inside the casing 74 by means not shown with a lever 155 which is adapted to push downwardly on finger 146 in response to counterclockwise swinging of lever 125, thereby rocking trunnion member 145 about the pin 147 and against the compression of spring 148. The finger 146 is thereby disengaged from fork 149 and engaged with fork 150 and swinging of the lever 95 away from the driver will rock shaft 142 about its axis and shift idler gear 85 into mesh with gears 83 and 84. Upon return of lever 95 to neutral postion, spring 148 will return the parts to the position shown in Fig. 12 and the shift mechanism will again be conditioned for shifting sleeve 89 into engagement with direct drive clutch 87 or low speed drive clutch 94 depending upon the direction of swing of lever 95.

From Figs. 12, 13 and 14 it may be seen that the portion 156 of the shift finger 146 which engages the fork 149 is cam shaped and the slot 157 of the fork which receives the portion 156 is large enough to permit a considerable amount of lost motion of finger 146 before the fork is shifted. This is for the purpose of permitting the lever 95 to be moved back to neutral position from high or low speed position without necessarily moving the sleeve 89, thereby opening the switch 135 (because of the action of the cam 133) without disturbing the position of the sleeve 89. If, however, it is desired to shift into reverse from high speed for example, which action cannot be accomplished until rail 151 is returned to neutral because of interlock pin 153, see Fig. 14, movement of finger 146 downwardly will automatically cause rail 151 to be returned to neutral because of the engagement of the cam portion of the finger 146 with the right hand projection 158 of fork 151. These projections are provided in each side of slot 157 as illustrated and function to return rail 151 to neutral whenever the finger 146 is moved to engage the fork 150. This operation will be more fully explained below.

Referring now to Fig. 15 in conjunction with Figs. 2 and 12, it may be seen that field coils 58 and 59 are connected to the vehicle battery 159 through a plurality of control instrumentalities which include a governor controlled switch 160, an accelerator operated switch 161 and a pedal operated rheostat switch 162, in addition to the aforementioned switch 135 which is operated by the plate 121.

The switch 160 is operated by a governor mechanism 163 of any suitable type driven by a shaft 164' from the countershaft cluster gear 83, and is provided with two sets of terminals adapted to be bridged by a conductor element 164. When the switch 160 is in low speed condition, as in Fig. 15, underdrive coil 59 is connected to battery 159 through wires 167, 168, element 164, wire 169, switch 162, wire 170, switch 135 and wire 171. The rheostat switch 162 is operated by a pedal 172, which is equivalent in its operation to a conventional clutch pedal. The switch is "on" when the pedal 172 is released and "off" when the pedal is fully depressed, intermediate positions of the pedal causing varying amounts of resistance to be introduced into the circuit as can be readily understood from Fig. 15.

When switch 160 is in high speed position, coil 59 may also be energized through switch 161 which is operated by the accelerator pedal 173. The latter is pivoted at 174 to the vehicle floor board 175 and is urged to throttle closed position by spring 176. A link 177 connects the pedal with a lever 178 pivoted at 179 to the lower surface of the floor board. A link 180 transmits swinging motion of lever 178 through a suitable lost motion connection 181 to a throttle valve control lever 182. The latter is adapted to be swung about its pivot until it engages the stop 184 carried by carburetor riser 183 at which position the throttle valve is wide open. The pedal 173, lever 178 and link 180 are then adapted to have further movement overtravelling wide open throttle valve position which is permitted by compression of the spring 185 of the lost motion connector 181. This over-travelling movement operates to swing lever 186, which is fixed to lever 178, far enough for finger 189 thereof to engage the operating finger 187 of switch 161 whereupon the switch is closed, thereby completing a circuit from coil 59 to battery 159 through wires 167, 191, terminals 192, 193 of switch 160, wire 169, switch 162, wire 170, switch 135 and wire 171.

Whenever switch 161 is closed by the aforesaid overtravel movement of pedal 173, it stays closed until the pedal is returned substantially to throttle closed position. This is due to the fact that switch 161 is of the snap-over type and finger 190 of lever 186 is purposely positioned so that it will not engage the switch operating finger 187 until the accelerator pedal 173 is fully released. Operation of switch 161 by overtravel operation of the accelerator pedal is commonly referred to as "kickdown" operation.

The switch 161 of the double pole, double throw type and when it is open with respect to underdrive coil 59 it is closed with respect to direct drive coil 58. The latter is connected to the battery 159 through wire 194, switch 161, wire 191, switch 160, wire 169, switch 162, wire 170, switch 135 and wire 171. The battery is grounded at 195 and is shunted by the usual generator 196.

Fig. 16 illustrates a modification of the Fig. 15 control circuit, wherein the circuit is altered by substituting a governor controlled rheostat switch 162' for the pedal controlled switch 162. In the Fig. 16 modification, the switch 162' is exactly the same in construction and operation except that it is automatically operated by a governor 197. The latter is intended to be driven by the engine A in any suitable manner, for example by the generator drive shaft, and functions to open the circuit between wires 169' and 170' gradually when the vehicle comes to a stop and to gradually energize coil 59 when the vehicle is started.

If desired as a safety feature, the regular vehicle ignition switch may be inserted in the circuit of coils 58 and 59 to thereby render the circuits thereto dead unless the ignition switch is "on." This feature is omitted from the drawings for the sake of simplicity.

In describing the operation of the drive, let it be assumed that the vehicle is at rest with the engine A idling and the gear shift lever 95 in neutral position. In order to start the vehicle for forward travel, gear shift lever 95 is swung about the axis of the steering column 98 away from the driver, which action causes the sleeve 89 to be moved rearwardly of Fig. 7 to thereby mesh the teeth thereof with clutch teeth 94 of low speed gear 82. At the same time the accompanying movement of plate 121 permits plunger 134 of switch 135 to move upwardly of Fig. 5 under the influence of spring 136, thereby to bridge switch terminals 138. The cam 133 of plate 121 is so designed that the plunger 134 of switch 135 will be held in switch-open position until the plate 121 has been swung sufficiently to fully engage the sleeve 89 with the clutch teeth 94 or the clutch teeth 87, as the case may be. This feature makes it possible to shift the sleeve 89 without clashing of teeth and without the necessity of depressing pedal 172.

Shifting of sleeve 89 then into low speed position causes switch 135 to close, thereupon energizing underdrive coil 59 through wires 167, 168, terminals 165, 166 of switch 160, wire 169, switch 162, wire 170, switch 135 and wire 171. Under these conditions, the rheostat switch 162 is in the Fig. 15 position with all of the resistance cut out of the circuit and the governor controlled switch 160 is in the Fig. 15 position with the movable conductor member 164 bridging the terminals 165, 166 thereof.

Depression of the accelerator pedal 173, therefore, will cause the vehicle to be accelerated in a forward direction with the electrical unit B operating in underdrive and the manual gear box C operating in its low speed postiion. When the vehicle has been accelerated to a speed of approximately 7 M. P. H. the governor mechanism 163 will operate to open the circuit between terminals 165 and 166 of switch 160 and close the circuit between terminals 192 and 193 thereof. This action of governor 163 will cause underdrive coil 59 to be de-energized and direct drive coil 58 to be energized through wire 194, switch 161 (which is in closed position with respect to coil 58), wire 191, switch 160, wire 169, switch 162, wire 170, switch 135 and wire 171. The underdrive mechanism B is now operating in direct drive with the planetary gear set D substantially locked up in one to one ratio. This corresponds to second speed position in conventional transmission mechanisms.

Direct drive in gear box C corresponding to third speed position in conventional transmission mechanisms, may now be obtained by swinging gear shift lever 95 about the axis of the steering column 98 toward the driver. As the lever 95 is swung backwardly, the plate 121 moves plunger 134 of switch 135 to switch open position, thereby de-energizing both direct drive coil 58 and underdrive coil 59. At the same time sleeve 89 is moved out of engagement with clutch teeth 94 and into engagement with clutch teeth 87, thereby stepping up the drive ratio in gearbox C. Inasmuch as both coils 58 and 59 were de-energized by the action of the cam 133 during the time that the shift of sleeve 89 was being made, the load was relieved momentarily from the shaft 27, thereby permitting the sleeve 89 to be shifted without the necessity of depressing pedal 172. When the shift lever 95 reaches the extremity of its movement to high speed position, which, it would be pointed out includes the movement necessary to take up the lost motion on finger 146 with respect to slot 157 of shift fork 149, plunger 134 of switch 135 is again permitted to move to switch closed position under the action of the spring 136 and underdrive coil 59 is again energized. Governor operated switch 160 having again returned to its low speed position during idling of engine A, the vehicle is now in underdrive in unit B and in direct drive in gear box C. This corresponds to third speed position in conventional transmissions.

The car may now be accelerated to a speed of approximately 18 M. P. H. when governor mechanism 163 will operate to open the circuit between terminals 165, 166 of switch 160 and close the circuit between terminals 192, 193 thereof, whereupon underdrive coil 59 will be de-energized and direct drive coil 58 will be energized in the manner explained above. The governor mechanism 163 operates at a higher speed when gear box C is in high speed position due to the fact that the governor is driven from countershaft cluster gear 83 which, of course, rotates slower when gear box C is in high speed position for a corresponding car speed. The difference in speed being in accordance with the step-up in ratio. The vehicle under these conditions is being driven in direct drive in both units B and C, this condition being equivalent to overdrive in conventional transmissions. It is intended to provide a rear axle ratio of approximately 3.2 to 1, thereby obtaining the advantages usually obtained by the use of an overdrive mechanism.

With such a rear axle ratio it is, of course, obvious that the accelerating characteristics of the car will be sluggish and provision is made for an instantaneous return to underdrive in unit B when rapid acceleration is desired as, for example, when passing cars at speeds above the operating speed of governor 163 or when climbing hills.

Return to underdrive in unit B is accomplished by kickdown operation of accelerator pedal 173. Depression of the said pedal beyond wide open throttle position compresses the spring 185 of the lost motion connection 181 and permits movement of lever 178 sufficiently to swing lever 186 to such position that the finger 189 thereof engages the operating finger 187 of switch 161. Movement of the finger 187 de-energizes the direct drive coil 58 by opening the circuit between wires 194 and 191 and at the same time energizes underdrive coil 59 through wires 167, 191, terminals 192, 193 of switch 160, wire 169, switch 162, wire 170, switch 135 and wire 171. After the vehicle has been accelerated to the desired speed, return to direct drive condition is made by releasing accelerator pedal 173 which will return to throttle closed position under the influence of the spring 176 whereupon the finger 190 of lever 186 will engage the operating finger 187 of switch 161 to thereby open the circuit between wires 167 and 191 and close the circuit between wires 194 and 191.

When the vehicle is brought to a stop, the governor mechanism 163 will operate at a speed of approximately 10 M. P. H. to open the circuit between terminals 192, 193 of switch 160 and close the circuit between terminals 165, 166 thereof. This will cause unit B to return to underdrive condition of operation and the vehicle may be brought to stop by application of the brakes with the gear shift lever 95 remaining in high speed position. The governor mechanism 163 operates to return the unit B to underdrive condition at a slower speed than is the case when the change is made from underdrive to direct in unit B because of the lag which is inherent in most governor mechanisms when speed thereof is reduced. This condition is a desirable one because it is not desirable to change to underdrive in unit B at a speed higher than approximately 10 M. P. H. In some cases it might be desirable to further reduce this speed in order that change to underdrive in unit B will not take place every time the vehicle is slowed down in traffic unless it is slowed down to an extremely slow speed which requires the use of the underdrive mechanism to obtain a smooth pick up to cruising speed.

If the vehicle remains at rest with the gear shift lever 95 at high speed position, there will be a creeping tendency due to the fact that coil 59 remains energized and the amount of torque developed by the engine at idling speed thereof is being transmitted to the tail shaft 11. This creeping tendency may be overcome by moving the gear shift lever 95 to neutral position thereupon de-energizing coil 59 through the action of the switch 135. This last action may be accomplished without disengaging sleeve 89 from clutch 87 because of the movement of the finger 146 permitted in the slot 157 of the fork 149 without causing shifting movement of the fork 149 or rail 151. Thus the vehicle may remain at rest with the rear gear box C in direct drive condition and the coils 58 and 59 de-energized. The vehicle may be started from rest simply by movement of the gear shift lever 95 to high speed position, which action is accomplished quickly and easily by a flick of the finger whereupon coil 59 will be energized and the vehicle may be accelerated smoothly with the unit B operating in underdrive and the unit C in direct drive. When predetermined speed has been reached a change to direct drive in unit B will be accomplished by operation of the governor switch 160, as described above.

The car may also be held at rest without creep with the sleeve 89 engaged and the gear shift lever 95 in high or low speed position by depressing the pedal 172 to the extent of its movement whereupon the switch 162 will be opened and the coil 59 de-energized. Switch 162 is particularly useful when the car is being maneuvered at relatively slow speeds, for example as when parking. By manipulation of pedal 172 the resistance in the electrical circuit may be varied as desired and an effect similar to feathering of a friction clutch may be obtained.

Reverse operation of the vehicle is obtained by moving the gear shift lever 95 to neutral position and rocking it upwardly of the steering column, thereby to move the shift finger 146 out of engagement with fork 149 and into engagement with fork 150. If sleeve 89 is in either of its engaged positions, it will be automatically cammed back to neutral position by the action of the cam shaped portion 156 of the finger 146 during its movement into engagement with the fork 150. After the finger 146 has been engaged with the fork 150, swinging of the gear shift lever 95 counterclockwise of the steering column axis will move the idler gear 85 rearwardly of Fig. 7 and into mesh with gears 83 and 84, thereby establishing reverse drive condition in gear box C. The operation of the underdrive mechanism B is exactly the same in reverse as for forward speeds and a two speed reverse operation may be obtained in the same manner except that the speed at which the governor 163 operates will be somewhat lower due to the fact that the reverse drive ratio is relatively low.

When the control mechanism is modified by the substitution of an engine driven governor in place of the pedal 172 as is illustrated in Fig. 16 of the drawings, the operation of the mechanism is substantially the same for all conditions of operation except that the underdrive coil 59 is gradually energized by operation of the governor 197 upon speeding up of the vehicle motor and is gradually de-energized by operation of the governor when the vehicle is brought to stop. When the vehicle is at rest, the switch 162' will be open, the governor 197 being adjusted so that this will occur at idling speed of the engine, and thus an automatic no-creep condition is achieved.

Thus it may be seen that we have provided an improved transmission mechanism which is simple in construction and operation and which does not require the acquisition of new driving technique. While only one of the many possible embodiments of the invention has been illustrated and described in this application, it is desired to point out that those skilled in the art will readily perceive that many variations in the mechanism are possible without departing from the spirit of the invention. It is therefore not desired to limit the invention in its broader aspects to the mechanism shown and described herein, except as set forth in the claims appended below.

We claim:

1. In a power transmission having an input structure, an output structure and a shaft adapted to drivingly connect said structures, electric power operated means for drivingly connecting said input structure with said shaft; gear means for drivingly connecting said shaft with said output structure; means for shifting said gear means between neutral and a plurality of drive-establishing positions; switch means associated with said shift means operable to energize said electric power means only upon movement of said shift means to drive-establishing position; and a lost motion connection between said gear means and said shift means for permitting movement of said shift means to neutral position without disturbing the drive-establishing setting of said gear means thereby to effect deenergization of said electric power means without disengaging said gear means.

2. The combination set forth in claim 1 wherein the shift means comprises a manually operable lever and a cam operatively connected therewith for operating the switch means.

3. The combination set forth in claim 1 wherein the shift means comprises a manually operable lever and a cam operatively connected therewith for operating the switch means; the said cam being so constructed and arranged with respect to said switch means that said switch means is actuated to circuit forming position only when said lever has reached the extremity of its movement to one of its drive-establishing positions.

4. In a power transmission having an input structure, an output structure and a shaft for drivingly connecting said structures, a planetary gearset including an annulus gear connected to said input structure, a planet gear carrier connected to said shaft, and a sun gear adapted to be held against rotation to establish a reduced speed driving connection between said input structure and shaft; means for releasably locking said sun gear against rotation comprising a spider carried by said sun gear and having a toothed iron portion, a stationary iron core having teeth disposed in close radial proximity with respect to the teeth on said spider, a field coil carried by said core; and means for energizing said field coil whereby eddy currents are induced in said teeth during rotation of said spider.

5. In a power transmission having an input structure, an output structure and a shaft for drivingly connecting said structures, a planetary gearset including an annulus gear connected to said input structure, a planet gear carrier connected to said shaft, and a sun gear adapted to be held against rotation to establish a reduced speed driving connection between said input structure and shaft; means for releasably coupling said sun gear to said carrier thereby to establish a 1 to 1 driving connection between said input structure and said shaft; and means for releasably locking said sun gear against rotation comprising a spider carried by said sun gear and having a toothed iron portion, a stationary iron core having teeth disposed in close radial proximity with respect to the teeth on said spider, a field coil carried by said core; and means for energizing said field coil whereby eddy currents are induced in said teeth during rotation of said spider.

6. In a power transmission having a casing, an input structure, an output structure and a shaft for drivingly connecting said structures, a planetary gearset including an annulus gear connected to said input structure, a planet gear carrier connected to said shaft, and a sun gear adapted to be held against rotation to establish a reduced speed driving connection between said input structure and shaft; means for releasably locking said sun gear against rotation comprising an eddy current brake; means for coupling said sun gear to said input structure comprising an eddy current clutch, said brake and clutch including a member common to both and connected with said sun gear, and a field structure for said brake and clutch including a core non-rotatably carried in said casing.

7. In a power transmission having an input structure, an output structure and a shaft for drivingly connecting said structures, a planetary gearset including an annulus gear connected to said input structure, a planet gear carrier connected to said shaft, and a sun gear adapted to be held against rotation to establish a reduced speed driving connection between said input structure and shaft; means for releasably locking said sun gear against rotation comprising an eddy current brake; and means for coupling said sun gear to said input structure comprising an eddy current clutch; field coils for energizing said brake and clutch; shiftable means for coupling said shaft to said output structure; and means operated by the actuation of said shiftable means for controlling the excitation of said field coils.

8. In a motor vehicle having an engine, a drive shaft driven by the engine and a driven shaft adapted to drive the vehicle, a casing enclosing said shafts; a planetary gearset disposed in said casing and having a reaction gear adapted to be held against rotation to provide drive between said shafts; means including a core carried by said casing for generating a magnetic field; a member carried by said reaction gear having a portion extending into said field, and means including teeth disposed on said member and core for inducing eddy currents in said member during rotation thereof whereby said rotation is opposed.

9. In a motor vehicle having an engine, a drive shaft driven by the engine and a driven shaft adapted to drive the vehicle, a casing enclosing said shafts; a planetary gearset disposed in said casing and having a reaction gear adapted to be held against rotation to provide drive between said shafts; means including a core carried by said casing and coaxial with said gear for generating a magnetic field; a member carried by said reaction gear having a portion extending into said field in radial juxtaposition to opposite portions of said core, and means on said extending portion for producing in said member during rotation thereof a flux which reacts with the flux of said field thereby to oppose rotation of said member.

10. In a motor vehicle having an engine, a drive shaft driven by the engine and a driven shaft adapted to drive the vehicle, a casing enclosing said shafts; a planetary gearset disposed in said casing including a reaction gear adapted to be coupled to one of the other planetary elements to provide direct drive between said shafts or to be held against rotation to provide torque multiplying drive between said shafts; a drive control member carried by said sun gear for rotation therewith; a drive member carried by said drive shaft for rotation therewith and disposed in radial juxtaposition relative to said drive control member; a stationary core mounted in said casing; a pair of field coils carried by said core and adapted upon energization thereof to produce separate magnetic fields, the flux of one field circulating through said core, said drive member and drive control member respectively and the flux of the other field circulating through said core and said drive control member respectively; means on one of said members for causing the induction of eddy currents in the other of said drive and drive control members upon energization of said one field and relative rotation of said members and means on said drive control member for causing induction of eddy currents in said core and said drive control member upon energization of said other field and rotation of said drive control member relative to said core.

11. In a motor vehicle having an engine, a drive shaft driven by the engine and a driven shaft adapted to drive the vehicle, a casing enclosing said shafts; a planetary gearset disposed in said casing including a reaction gear adapted to be coupled to one of the other planetary elements to provide direct drive between said shafts or to be held against rotation to provide a torque multiplying drive between said shafts; a drive control member carried by said sun gear for rotation therewith; a drive member carried by said drive shaft for rotation therewith and disposed in radial juxtaposition relative to said drive control member; a stationary core mounted in said casing; a pair of field coils carried by said core; said coils being so arranged with respect to the aforesaid drive and drive control members that said drive and drive control members form part of the magnetic flux path around one coil while said drive control member only forms part of the magnetic flux path around the other coil; means on said drive control member for causing induction of eddy currents in said drive member upon energization of said first coil and relative rotation of said members whereby to couple said members in drive, and further means on said drive control member for causing induction of eddy currents in said drive control member and core upon energization of said other coil and rotation of said drive control member whereby to hold said drive control member against rotation.

12. In a motor vehicle having an engine, a drive shaft driven by the engine and a driven shaft adapted to drive the vehicle, a casing enclosing said shafts; a planetary gearset disposed in said casing including a reaction gear adapted to be coupled to one of the other planetary elements to provide direct drive between said shafts or to be held against rotation to provide torque multiplying drive between said shafts; an electrical eddy current clutch mechanism for coupling said planetary elements to provide said direct drive; an electrical eddy current brake mechanism for holding said reaction gear against rotation to provide said torque multiplying drive; said clutch and brake mechanisms including a stationary core structure and a pair of coils carried by said core structure and a plurality of control elements for controlling energization of said coils.

13. In a motor vehicle having an engine, a throttle control for said engine, a drive shaft driven by the engine and a driven shaft adapted to drive the vehicle, a casing enclosing said shafts; a planetary gearset disposed in said casing including a reaction gear adapted to be coupled to one of the other planetary elements to provide direct drive between said shafts or to be held against rotation to provide torque multiplying drive between said shafts; an electrically actuated clutch mechanism for coupling said planetary elements to provide said direct drive; an electrically actuated brake mechanism for holding said reaction gear against rotation to provide said torque multiplying drive; governor means responsive to speed of the driven shaft for controlling energization of said electrically actuated mechanism, and acceleration control means operable independently of said governor means when said governor means is still retained in clutch mechanism energizing position to de-energize said clutch mechanism and energize said brake mechanism to place said shafts in torque multiplying drive.

14. In a motor vehicle having an engine provided with a throttle control, a driving structure adapted to receive drive from the engine and a driven structure adapted to drive the vehicle, relatively slow speed driving means for driving the driven structure from the driving structure comprising a planetary gearset; an electrically actuated brake for locking the reaction element of said planetary gearset against rotation to establish said slow speed drive; an electrically actuated clutch including a part carried by the driving structure adapted to clutch said reaction element to said driving structure thereby to establish a direct drive connection between said structures; means operably associated with said brake and clutch respectively for controlling operation thereof as a function of speed of said driven structure such that the clutch is deenergized during operation of said slow speed drive and is energized at a predetermined driven structure speed accompanied by simultaneous deenergization of said brake thereby to provide a step-up in driving ratio; a source of electrical energy; and means independent of said speed control means, operable in response to movement of said throttle control to substantially wide open throttle position, and while said speed control means is still retained in clutch energizing position, for effecting a step-down in driving ratio.

15. In a motor vehicle having an engine provided with a throttle control, a driving structure adapted to receive drive from the engine and a driven structure adapted to drive the vehicle, relatively slow speed driving means for driving the driven structure from the driving structure comprising a planetary gear set, an electrically actuated brake for locking the reaction element of said planetary gear set against rotation to establish said slow speed drive, an electrically actuated clutch including a part carried by the driving structure adapted to clutch said reaction element to said driving structure thereby to establish a direct drive connection between said structures, said clutch transmitting torque by induction of eddy currents in the relatively rotatable parts thereof, a stationary field coil disposed in juxtaposed relation to said clutch parts for inducing said currents, means operably associated with said brake and clutch respectively for controlling operation thereof as a function of vehicle speed such that the clutch is de-energized during operation of said slow speed drive and is energized at predetermined vehicle speed accompanied by simultaneous de-energization of said brake thereby to provide a step-up in driving ratio, a source of electrical energy, and means operable in response to movement of said throttle control to substantially wide open throttle position for effecting a step-down in driving ratio.

16. In a motor vehicle having an engine provided with a throttle control, a driving structure adapted to receive drive from the engine and a driven structure adapted to drive the vehicle, relatively slow speed driving means for driving the driven structure from the driving structure comprising a planetary gear set, an electrically actuated eddy current type brake for locking the reaction element of said planetary gear set against rotation to establish said slow speed drive, an electrically actuated clutch including a part carried by the driving structure adapted to clutch said reaction element to said driving structure thereby to establish a direct drive connection between said structures, means operably associated with said brake and clutch respectively for controlling operation thereof as a function of vehicle speed such that the clutch is de-energized during operation of said slow speed drive and is energized at predetermined vehicle speed accompanied by simultaneous de-energization of said brake thereby to provide a step-up in driving ratio, a source of electrical energy, and means operable in response to movement of said throttle control to substantially wide open throttle position for effecting a step-down in driving ratio.

17. In a power transmission for driving a vehicle having an engine provided with a throttle valve, an accelerator pedal operable by the vehicle driver; means operably connecting said accelerator pedal with said throttle valve accommodating movement of said accelerator pedal through a primary range for adjusting the throttle between its fully closed and opened positions and through a secondary range overtravelling the primary range; a driving structure adapted to receive drive from the engine; a driven structure adapted to transmit drive from the driving structure for driving the vehicle; relatively slow speed driving means including a reaction member adapted to be held against rotation to establish drive between said structures; relatively fast speed driving means including electrically actuated clutch means for clutching said reaction member to one of said structures thereby to establish a drive therebetween at a speed ratio faster than that provided by said slow speed driving means; electrically actuated brake means for holding said reaction member; means operably associated with said brake means and said clutching means for controlling operation thereof as a function of vehicle speed such that said brake means is operable at low vehicle speeds and said clutch means is prevented from operation during operation of said brake means but is caused to operate at predetermined vehicle speed coincidentally with release of said brake means; and means operable in response to driver operation of said accelerator pedal through said secondary overtravelling range for controlling operation of said brake and clutch.

18. In a power transmission for driving a vehicle having an engine provided with a throttle valve, an accelerator pedal operable by the vehicle driver; means operably connecting said accelerator pedal with said throttle valve acmmodating movement of said accelerator pedal through a primary range for adjusting the throttle between its fuly closed and opened positions and through a secondary range overtravelling the primary range; a driving structure adapted to receive drive from the engine; a driven structure adapted to transmit drive from the driving structure for driving the vehicle; relatively slow speed driving means including a reaction member adapted to be held against rotation to establish drive between said structures; relatively fast speed driving means including electrically actuated clutch means for clutching said reaction member to one of said structures thereby to establish a drive therebetween at a speed ratio faster than that provided by said slow speed driving means; electrically actuated brake means for holding said reaction member; means operably associated with said brake means and said clutching means for controlling operation thereof as a function of vehicle speed such that said brake means is operable at low vehicle speeds and said clutch means is prevented from operation during operation of said brake means but is caused to operate at predetermined vehicle speed coincidentally with release of said brake means; and means operable in response to driver operation of said accelerator pedal through said secondary overtravelling range for controlling operation of said brake and clutch to release said clutch and simultaneously apply said brake thereby changing the drive from the fast drive to the slow drive.

19. In a power transmission for driving a vehicle having an engine provided with a throttle valve, an accelerator pedal operable by the vehicle driver; means operably connecting said accelerator pedal with said throttle valve accommodating movement of said accelerator pedal through a primary range for adjusting the throttle between its fully closed and opened positions and through a secondary range overtravelling the primary range; a driving structure adapted to receive drive from the engine; a driven structure adapted to transmit drive from the driving structure for driving the vehicle; relatively slow speed driving means including a reaction member adapted to be held against rotation to establish drive between said structures; relatively fast speed driving means including electrical eddy-current operated clutch means for clutching said reaction member to one of said structures thereby to establish a drive therebetween at a speed ratio faster than that provided by said slow speed driving means; electrical eddy-current operated brake means for holding said reaction member; means operably associated with said brake means and said clutching means for controlling operation thereof as a function of vehicle speed such that said brake means is operable at low vehicle speeds and said clutch means is prevented from operation during operation of said brake means but is caused to operate at predetermined vehicle speed coincidentally with release of said brake means; and means operable in response to driver operation of said accelerator pedal through said secondary overtravelling range for controlling operation of said brake and clutch to release said clutch and simultaneously apply said brake thereby changing the drive from the fast drive to the slow drive.

20. In a power transmission for a motor vehicle having an engine, a drive shaft driven by the engine; a driven shaft adapted to be driven from said drive shaft at a relatively slow speed ratio relatively thereto or at 1 to 1 ratio relatively thereto; a driving element adapted to be held stationary during said slow speed ratio drive and to be clutched to said drive shaft to establish said 1 to 1 speed ratio drive; an electrical eddy current actuated brake for holding said drive element stationary; an electrical eddy current actuated clutch for clutching said driving element to said drive shaft; a stationary field structure for energizing said brake and clutch; a pair of field coils carried by said field structure one for energizing the field structure of said brake and the other for energizing the field structure of said clutch; and means for selectively controlling energization of said coils to energize said brake coil only when imposing slow speed drive upon said driven shaft and to de-energize said brake coil and energize said clutch coil when establishing said drive and driven shafts in direct drive.

21. In a power transmission for a motor vehicle, a drive shaft; a driven shaft adapted to be driven from said drive shaft at a relatively slow speed ratio relatively thereto or at 1 to 1 ratio relatively thereto; a driving element adapted to be held stationary during said slow speed ratio drive and to be clutched to said drive shaft to establish said 1 to 1 speed ratio drive; an electrical eddy current actuated brake for holding said drive element stationary; an electrical eddy current actuated clutch for clutching said driving element to said drive shaft; a stationary field structure for energizing said brake and clutch; a pair of field coils carried by said field structure; a source of electrical energy; electrical circuit forming means connecting said source with said coils; and a plurality of control elements for controlling said circuit forming means whereby said coils may be selectively energized.

22. In a power transmission for a motor vehicle; a drive shaft; a driven shaft adapted to be driven from said drive shaft at a relatively slow speed ratio relatively thereto or at 1 to 1 ratio relatively thereto; a driving element adapted to be held stationary during said slow speed ratio drive and to be clutched to said drive shaft to establish said 1 to 1 speed ratio drive; an electrical eddy current actuated brake for holding said drive element stationary; an electrical eddy current actuated clutch for clutching said driving element to said drive shaft; a stationary field structure; a brake energizing coil carried by said field structure; a clutch energizing coil carried by said field structure; a source of electrical energy carried by the vehicle; circuit forming means connecting said source and said coils respectively; and means operable in response to the speed of said vehicle for selectively energizing said coils thereby to provide a change in speed ratio in accordance with vehicle speed.

23. In a power transmission for a motor vehicle, a drive shaft; a driven shaft adapted to be driven from said drive shaft at a relatively slow speed ratio relatively thereto or at 1 to 1 ratio relatively thereto; a driving element adapted to be held stationary during said slow speed ratio drive and to be clutched to said drive shaft to establish said 1 to 1 speed ratio drive; an electrical eddy current actuated brake for holding said drive element stationary; an electrical eddy current actuated clutch for clutching said driving element to said drive shaft; a stationary field structure; a brake energizing coil carried by said field structure; a clutch energizing coil carried by said field structure; a source of electrical energy carried by the vehicle; circuit forming means connecting said source and said coils respectively; and means driven by the engine of said vehicle for controlling energization of said brake energizing coil in response to predetermined increase in engine speed.

24. In a power transmission for a motor vehicle, a drive shaft; a driven shaft adapted to be driven from said drive shaft at a relatively slow speed ratio relatively thereto or at 1 to 1 ratio relatively thereto; a driving element adapted to be held stationary during said slow speed ratio drive and to be clutched to said drive shaft to establish said 1 to 1 speed ratio drive; an electrical eddy current actuated brake for holding said drive element stationary; an electrical eddy current actuated clutch for clutching said driving element to said drive shaft; a stationary field structure; a brake energizing coil carried by said field structure; a clutch energizing coil carried by said field structure; a source of electrical energy carried by the vehicle; circuit forming means connecting said source and said coils respectively, driver controlled means for controlling energization of said coils including means for energizing said brake coil to start the vehicle; and means operable in response to attainment of predetermined vehicle speed for simultaneously deenergizing said brake coil and energizing said clutch coil thereby to provide step-up in driving ratio.

25. In a power transmission for a motor vehicle, a drive shaft; a driven shaft adapted to be driven from said drive shaft at a relatively slow speed ratio relatively thereto or at 1 to 1 ratio relatively thereto; a driving element adapted to be held stationary during said slow speed ratio drive and to be clutched to said drive shaft to establish said 1 to 1 speed ratio drive; an electrical eddy current actuated brake for holding said drive element stationary; an electrical eddy current actuated clutch for clutching said driving element to said drive shaft; a stationary field structure; a brake energizing coil carried by said field structure; a clutch energizing coil carried by said field structure; a source of electrical energy carried by the vehicle; circuit forming means connecting said source and said coils respectively; a governor operated switch for selectively controlling energization of said coils in accordance with vehicle speed; and a driver operated rheostat switch for controlling energization of said coils.

26. In a power transmission for a motor vehicle; a drive shaft; a driven shaft adapted to be driven from said drive shaft at a relatively slow speed ratio relatively thereto or at 1 to 1 ratio relatively thereto; a driving element adapted to be held stationary during said slow speed ratio drive and to be clutched to said drive shaft to establish said 1 to 1 speed ratio drive; an electrical eddy current actuated brake for holding said drive element stationary; an electrical eddy current actuated clutch for clutching said driving element to said drive shaft; a stationary field structure; a brake energizing coil carried by said field structure; a clutch energizing coil carried by said field structure; a source of electrical energy carried by the vehicle; circuit forming means connecting said source and said coils respectively; an accelerator pedal for controlling the speed of said vehicle and switch means actuated by said pedal for controlling energization of said coils.

27. In a power transmission for a motor vehicle; a drive shaft; a driven shaft adapted to be driven from said drive shaft at a relatively slow speed ratio relatively thereto or at 1 to 1 ratio relatively thereto; a driving element adapted to be held stationary during said slow speed ratio drive and to be clutched to said drive shaft to establish said 1 to 1 speed ratio drive; an electrical eddy current actuated brake for holding said drive element stationary; an electrical eddy current actuated clutch for clutching said driving element to said drive shaft; a stationary field structure; a brake energizing coil carried by said field structure; a clutch energizing coil carried by said field structure; a source of electrical energy carried by the vehicle; circuit forming means connecting said source and said coils respectively; a governor controlled switch means operable in response to vehicle speed to cause energization of said brake coil at relatively low speeds and coincidental energization of said clutch coil and deenergization of said brake coil when said vehicle has been accelerated to predetermined speed.

28. In a power transmission for a motor vehicle, a drive shaft; a driven shaft adapted to be driven from said drive shaft at a relatively slow speed ratio relatively thereto or at 1 to 1 ratio relatively thereto; a driving element adapted to be held stationary during said slow speed ratio drive and to be clutched to said drive shaft to establish said 1 to 1 speed ratio drive; an electrical eddy current actuated brake for holding said drive element stationary; an electrical eddy current actuated clutch for clutching said driving element to said drive shaft; a stationary field structure; a brake energizing coil carried by said field structure; a clutch energizing coil carried by said field structure; a source of electrical energy carried by the vehicle; circuit forming means connecting said source and said coils respectively; a governor controlled switch means operable in response to vehicle speed to cause energization of said brake coil at relatively low speeds and coincidenal energization of said clutch coil and deenergization of said brake coil when said vehicle has been accelerated to predetermined speed; and means operable by the vehicle accelerator pedal after said predetermined speed has been reached for overruling said governor thereby to provide a return to slow speed ratio.

29. In combination with rotatable driving and driven members, a planetary gearset drivingly disposed between said members and including a drive control member adapted to be clutched to one of said rotatable members to provide 1 to 1 speed ratio drive therebetween or to be held against rotation to provide different speed ratio drive therebetween, a casing enclosing said members and gearing; a rotatable spider fixed to said drive control member, said spider having a cylindrical portion comprising a series of rings of magnetic material and non-magnetic material respectively alternately arranged; a core fixed in said casing having a bifurcated portion disposed in closely juxtaposed relation relative to one of said magnetic ring portions and a cylindrical portion disposed in closely juxtaposed relation relative another of said magnetic ring portions; and a pair of field coils carried by said core and so disposed that the flux path around one coil includes said one magnetic ring portion and the flux path around the other coil includes the said other magnetic ring portion and a portion of said driving member.

30. In a power transmission an input structure, an output structure, a shaft for drivingly connecting said structures, rotary means including a normally off eddy current brake mechanism for releasably coupling said input structure with said shaft in a torque multiplying drive, part of said means being associated with said input structure and part thereof being associated with said shaft; said rotary means also including a normally free eddy current clutch mechanism for releasably coupling said input structure and shaft in direct drive and said brake and clutch mechanism including a stationary core structure and a pair of field coils, one associated with said brake mechanism and the other with said clutch mechanism; and control means for obtaining sequential operation of said brake and clutch mechanisms including means to energize said brake coil upon drivingly connecting said output structure and said shaft and means to energize said clutch coil upon said output structure attaining a predetermined speed when in drive.

31. In a power transmission, an input structure, an output structure, a shaft for drivingly connecting said structures, a planetary gearset including a rotatable sun gear, an annulus gear connected to said input structure, and a planet gear carrier connected to said shaft; a normally free eddy current clutch for releasably coupling said annulus gear with said sun gear, a normally off eddy current brake for releasably holding said sun gear against rotation, gear means for drivingly connecting said shaft with said output structure, means for shifting said gear means between neutral and drive establishing position, means associated with said shift means for effecting on operation of said brake when said shift means establishes said gear means in drive position whereby to hold said sun gear from rotation and establish said input structure and shaft in a torque multiplying drive, and clutch control means responsive to speed changes in the transmission for effecting coupling of said annulus gear and sun gear by said clutch at a predetermined speed of said output structure whereby to establish said input structure and shaft in direct drive.

32. In a power transmission having an input structure, an output structure and a shaft for drivingly connecting said structure, a planetary gearset including an annulus gear connected to said input structure, a planetary gear carrier connected to said shaft and a sun gear adapted to be held against rotation to establish a reduced speed driving connection between said input structure and shaft, means for releasably coupling said sun gear to said annulus thereby to establish a direct driving connection between said input structure and shaft comprising a spider carried by said sun gear and having an iron portion, a rotatable member drivingly connected with said annulus having an iron portion disposed in radial juxtaposition to said iron portion on said spider, at least one of said iron portions being formed with teeth, a stationary iron core having a portion disposed in substantially closed radial proximity to said iron portion of said spider, a field winding associated with said core, and means for energizing said field winding whereby eddy currents are induced during relative rotation of said spider and said member.

33. In a power transmission for driving a vehicle having an engine provided with a throttle valve, an auxiliary pedal operable by the vehicle driver, means operably connecting said auxiliary pedal with said throttle valve for adjusting the throttle between its fully closed and open positions, a driving structure adapted to receive drive from the engine, a driven structure adapted to transmit drive from the driving structure for driving the vehicle, driving means including a reaction member adapted to be held against rotation to establish drive between said structures, driving means including eddy current actuated clutch means for clutching said reaction member to one of said structures thereby to establish a drive between said structures at a speed ratio faster than that provided by said first mentioned driving means, eddy current actuated brake means for holding said reaction member, means operably associated with said brake means and said clutch means for controlling operation thereof as a function of vehicle speed such that said brake means is operable at low vehicle speeds and said clutch means is prevented from operation during operation of said brake means but is caused to operate at predetermined higher vehicle speeds coincidently with release of said brake means, and kickdown means associated with said throttle adjusting means and operable only when in response to driver operation of said auxiliary pedal said throttle has reached a position at least adjacent its full open position to thereby control operation of said brake and clutch to effect a step-down in driving ratio between said structures.

34. In a motor vehicle having an engine, a throttle control for said engine, a shaft driven by the engine, a driven shaft adapted to drive the vehicle, a planetary unit and a speed change mechanism drivingly connected intermediate said shafts, said planetary unit including a reaction member adapted to be coupled to a second member of said unit or to be held against rotation to deliver a direct drive and a different speed ratio drive respectively for driving said driven shaft, an electrically energizable clutch mechanism for coupling said planetary members to provide said direct drive, an electrically energizable brake mechanism for holding said reaction member against rotation to provide said different speed ratio drive, means for selectively setting said speed change mechanism for establishing a plurality of speed ratio drives for driving said driven shaft, governor means operably connected with said electrically energizable mechanism and said speed change mechanism and responsive to speed changes in the latter during drive of the vehicle for controlling operation of said electrically energizable mechanisms whereby one thereof is de-energized at a predetermined vehicle speed and the other is energized for establishing a change in drive between said shafts and means independent of said governor means operable in response to movement of said throttle control to predetermined position for establishing a change in drive between said shafts by de-energizing one of said electrically energizable mechanisms from a condition of energization and energizing the other.

35. In a power transmission having an input structure; and an output structure; a planetary gearset for drivingly connecting said structures, said gearset comprising a rotatable element drivingly connected to said input structure, a second rotatable element drivingly connected to said output structure and a rotatable reaction element controllable to establish a speed ratio driving connection between said structures by said planetary elements; and means for controlling rotation of said reaction element including an annular iron portion connected to said reaction element, a stationary iron core, at least one of said annular portion and core having a plurality of spaced-apart tooth-like projections disposed in close radial proximity to the other of said portion and core, a field coil for magnetically energizing said annular iron portion and core and means for controlling energization of said field coil; there being eddy currents induced in at least one of said annular iron portion and core upon energization of said coil and during relative rotation between said reaction element and core for resisting said relative rotation whereby to establish said speed ratio driving connection.

36. In a power transmission having an input structure, and an output structure; a planetary gearset for drivingly connecting said structures, said gearset comprising a rotatable element drivingly connected to said input structure, a second rotatable element drivingly connected to said output structure and a rotatable reaction element controllable to establish a substantially direct speed ratio drive between said structures; and means for controlling rotation of said reaction element including a pair of rotatable annular iron drive control members, one positively connected to said reaction element and the other drivingly connected to said input structure, at least one of said control members having a plurality of spaced-apart tooth-like projections disposed in close radial proximity to the other of said control members, a stationary iron core positioned radially of said control member driven by said input structure, a field coil for magnetically energizing said core and control members, and means for controlling electrical energization of said field coil; there being eddy currents induced in at least of one of said control members upon energization of said core and relative rotation between said control members for coupling said control members in a torque transmitting relationship whereby to establish said direct speed ratio drive between said structures.

37. In a power transmission having an input structure, and an output structure; a planetary gearset for drivingly connecting said structures, said gearset comprising a rotatable element drivingly connected to said input structure, a second rotatable element drivingly connected to said output structure and a rotatable reaction element; means for controlling operation of said reaction element to establish a plurality of speed ratio drives between said structures one of which drives is a substantially direct speed ratio drive, said means comprising a first annular iron portion drivingly connected to said input structure, second and third annular iron portions constructed and arranged for positive rotation with said reaction element, stationary core means having one iron portion radially disposed of said first annular iron portion, and another iron portion radially disposed of said third annular iron portion, a plurality of spaced tooth-like projections on at least one of said first and second annular iron portions disposed in close radial proximity to the other of said first and second iron portions, a plurality of spaced toothlike projections on at least one of said third iron portion and other core portion disposed in close radial proximity to the other of said third iron portion and other core portion, field coil means for magnetically energizing said annular iron portions and core means, and means for controlling electrical energization of said field coil means for either, magnetically energizing said one core portion and said first and second annular iron portions whereby eddy currents may be induced in at least one of said first and second annular iron portions upon energization of said coil means and relative rotation between said first and second annular portions for coupling said first and second annular portions in a torque transmitting relationship to establish a substantially direct speed ratio drive between said structures, or magnetically energizing said other core portion and said third annular iron portion whereby eddy currents may be induced in at least one of said other core portion and third iron portion upon energization of said field coil means and relative rotation between said other core portion and said third iron portion for resisting said relative rotation to establish said other speed ratio drive between said structures.

38. In a motor vehicle having an engine, a drive shaft driven by the engine and output means adapted to drive the vehicle; a casing, a planetary gearset disposed in said casing including a reaction gear adapted to be coupled to one of the other planetary elements to provide a direct speed ratio drive between said drive shaft and output means or to be held against rotation to provide a different speed ratio drive between them; a drive control member positively connected to said reaction gear for rotation therewith; a drive member drivingly connected to said drive shaft for rotation therewith and disposed in radial juxtaposition relative to said drive control member; a stationary iron core supported in said casing; a pair of field coils carried by said core and adapted upon energization thereof to produce magnetic fields, a flux of one field circulating through said core, said drive member and drive control member respectively and the flux of the other field circulating through said core and said drive control member respectively; raised and depressed portions on one of said members for causing the induction of eddy currents in the other of said drive and drive control members upon energization of said one field and relative rotation of said members and raised and depressed portions on one of said drive control member and core for causing induction of eddy currents in one of said core and drive control member upon energization of the said other field and rotation of said drive control member relative to said core.

39. In a motor vehicle having an engine, a drive shaft driven by the engine and output means adapted to drive the vehicle, a casing, a planetary gearset disposed in said casing including a reaction gear adapted to be coupled to one of the other planetary elements to provide a substantially direct speed ratio drive between said drive shaft and output means or to be held against rotation to provide a different speed ratio drive between said drive shaft and output means, an electrical eddy current clutch mechanism for coupling said planetary elements to provide said substantial direct speed ratio drive, an electrical eddy current brake mechanism for holding said reaction gear against rotation to provide said different speed ratio drive, said clutch and brake mechanism including a plurality of rotatable annular iron portions, a stationary core structure in radial juxtaposition to said annular iron portions, a pair of coils carried by said core structure and control means for controlling energization of said coils.

HENRY W. GILFILLAN.
EDGAR L. BAILEY.